US007088563B2

(12) United States Patent
Ozawa et al.

(10) Patent No.: US 7,088,563 B2
(45) Date of Patent: Aug. 8, 2006

(54) INTERNAL MOTOR PROTECTOR FOR HERMETIC COMPRESSOR

(75) Inventors: Kouichi Ozawa, Shige Numazu (JP); Tatsuhiko Satoh, Susono (JP)

(73) Assignee: Sensata Technologies, Inc., Attleboro, MA (US)

( * ) Notice: Subject to any disclaimer, the term of this patent is extended or adjusted under 35 U.S.C. 154(b) by 631 days.

(21) Appl. No.: 10/435,965

(22) Filed: May 12, 2003

(65) Prior Publication Data

US 2003/0210502 A1 Nov. 13, 2003

(30) Foreign Application Priority Data

May 13, 2002 (JP) ............................ 2002-136944

(51) Int. Cl.
*H02H 5/04* (2006.01)

(52) U.S. Cl. ........................................................ 361/23

(58) Field of Classification Search .................. 361/23; 439/342, 259

See application file for complete search history.

(56) References Cited

U.S. PATENT DOCUMENTS

| | | | | |
|---|---|---|---|---|
| 3,470,513 | A * | 9/1969 | McMorrow et al. | 337/86 |
| 3,916,257 | A * | 10/1975 | Harper, Jr. | 361/32 |
| 3,996,547 | A * | 12/1976 | Kinjo | 337/363 |
| 4,748,531 | A * | 5/1988 | Ortiz | 361/24 |
| 5,515,217 | A * | 5/1996 | Higashikata et al. | 361/22 |
| 5,903,418 | A * | 5/1999 | Boivin et al. | 361/22 |
| 5,963,125 | A * | 10/1999 | Mochida et al. | 338/234 |
| 6,005,471 | A * | 12/1999 | Higashikata et al. | 337/347 |
| 6,398,570 | B1 * | 6/2002 | Yoshida et al. | 439/259 |
| 6,433,975 | B1 * | 8/2002 | Satoh et al. | 361/23 |
| 6,495,982 | B1 * | 12/2002 | Katsumata et al. | 318/471 |
| 6,548,924 | B1 * | 4/2003 | Furukawa et al. | 310/68 C |
| 6,837,723 | B1 * | 1/2005 | Randall et al. | 439/161 |

FOREIGN PATENT DOCUMENTS

| | | |
|---|---|---|
| JP | 10-89254 | 4/1998 |

* cited by examiner

*Primary Examiner*—Brian Sircus
*Assistant Examiner*—James A. Demakis
(74) *Attorney, Agent, or Firm*—Russell E. Baumann

(57) ABSTRACT

A protective device (1) which is attached on an internal side of a compressor, includes a housing (10) of an insulating material, a motor protector (20) placed on the housing (10) and having a thermally responsive switch inside, a fuse device (30), a connective terminal (40) electrically connected to a hermetic terminal in the compressor, and a quick connect terminal (50). A portion (11) of the housing for varying an installation position of the connective terminal (40) includes a plurality of vertical grooves (11*a*) and a horizontal slot (11*b*). These grooves and slots (11*a* and 11*b*) are formed equally spaced from one another at a periphery of the housing (10). The connective terminal (40) has an engaging part (41) and a fuse connecting part (43). The fuse connecting part (43) is inserted through the horizontal slot (11*b*), and the engaging part (41) is engaged with a selected vertical groove (11*a*) to determine a direction and/or a position of the protective device (1) in the compressor. The installation position of the connective terminal (40) for the housing (10) can be varied by selecting any groove (11*a*) of the plurality and the protecting device (1) can be arranged in a small space depending on the specifications of the compressor.

10 Claims, 8 Drawing Sheets

INTERNAL MOTOR PROTECTOR FOR HERMETIC COMPRESSOR

FIELD OF THE INVENTION

This invention relates generally to a protector for a hermetic type electromotive compressor and more particularly to an internal protective device of the cluster-block type for installation in a hermetic electromotive compressor.

BACKGROUND OF THE INVENTION

In hermetic electromotive compressors, an internal protective device is typically employed for detecting excess current that flows to the motor and abnormally high ambient temperature when an abnormal situation such as running under an excess load or a coolant gas leak, etc., develops. The internal protective device contains a bimetal switch that senses excess current or abnormal temperature in the atmosphere and, if an abnormal situation is detected, the contact of the bimetal switch is opened and the circuit is shut off, thereby protecting the motor from any possible damage.

In an electromotive compressor, an air-tight terminal or a fusite pin assembly (C: a common terminal, M: a main winding terminal, and S: an auxiliary winding terminal) is provided for the purpose of connecting the windings of the motor and an external power supply source and the internal protective device is connected to the C pin of the fusite pin assembly.

Separate from protection based on the bimetal switch, an Integral Back-up Protection System (IBPS) element which has a fuse function of instantaneously shutting off an abnormal current which is dozens of times greater than the rated current that flows which would cause contact deposition of the bimetal switch or short-circuiting of the motor winding. The IBPS element is connected in series with the bimetal switch and, along with the bimetal switch, it is installed in the electromotive compressor.

As an example of technology of this kind, the structure of the installation of a protector for hermetic type electromotive compressors is disclosed in Toku Kai Hei 10-89254. The protector has a heat-responsive switch, an insulated holder that holds a receptacle and a connective terminal and connects the receptacle to the electrically conductive terminal of a glass air-tight terminal of a hermetic electromotive compressor.

Nevertheless, the internal protective device for the electromotive compressor according to the prior art has had the following problems:

In hermetic electromotive compressors, the position for the installation of the internal protective device at the air-tight terminal (fusite pin), its size and its direction can be different, depending upon the internal specifications of the compressor manufacturers. Because of this, the internal protective devices have to have a design specification that meets the requirements of the manufacturers.

For example, the space for the installation of the internal protective device (the shape of the space) can be different, depending upon the arrangement of the common terminals (C), the main winding (M) and the auxiliary winding (S) of the fusite pin assembly of the electromotive compressor, the direction of the winding and the position of the exhaust pipe, etc. Thus, it has been necessary to design internal protective devices having different configurations in order to fit such spaces.

Varying the metal mold for a modification of the shape of a plastic insulative housing that is a part of the internal protective device or changing the connective tool for the receptacle, etc., leads to an increase in the cost, thereby making it difficult to offer a protective device at low cost.

SUMMARY OF THE INVENTION

An object of the present invention is to provide a device that overcomes the above-described problem of conventional technology. Another object is the provision of a protective device which is capable of varying the installation position of the connective terminal so that it conforms with the specifications of the various hermetic type electromotive compressors. Another object of the invention lies in providing a protective device for hermetic electromotive compressors which is low in cost and yet reliable.

Briefly described, the protective device made in accordance with the invention has a housing made of electrically insulative material, a motor protector which is installed in the housing and which contains a heat-responsive switch therein, a first connective part of a first connective terminal which is electrically connected to the air-tight terminal provided on the electromotive compressor and a second connective part of the first connective terminal which is electrically connected to the protector, with an installation position varying part capable of changing the installation position of the first connective terminal being provided on the housing and an engaging part of the first connective terminal that engages with the installation position varying part.

The installation position varying part preferably includes a plurality of grooves that are formed on the housing, the engaging part containing a protuberant part which can be inserted into or fixed to one of the plurality of grooves. It is preferred that the plurality of grooves be formed approximately at equal intervals on the outer periphery of the housing. Preferably, further, the housing includes a cylindrical surface at a part thereof, with the grooves being formed on the cylindrical surface plus a horizontal through slot that extends in a horizontal direction being formed adjacent to the plurality of grooves and the second connective part of the first connective terminal being inserted through the horizontal through slot.

Because of the construction as described above, when the installation position of the housing is modified in conformity with the position where the first connective terminal is installed on the installation position varying part and the engaging part of the first connective terminal is engaged with one of the plurality of grooves selected, the housing is arranged at a selected position in the electromotive compressor.

It is also possible to arrange the housing in such a fashion that preferably when the engaging part of the first connective terminal is engaged with one of the grooves formed on the cylindrically shaped surface, the housing may be arranged at a selected installation angle of the electromotive compressor. By making the installation position of the first connective terminal to the housing variable, the protective device can be freely installed in conformity with the arrangement of the air-tight terminal in the electromotive compressor, the space of the protective device that is to be connected to the air-tight terminal or the wiring leading to the motor winding, etc.

More preferably, the second connective part of the first connective terminal may be electrically connected to the protector through a fuse element and the fuse element contains an insulative plastic part and a metal part that is fixed in the insulative plastic part and the insulative plastic part is fixed in the space that has been formed in the housing.

The motor protector preferably has a metal container that accommodates the heat-responsive switch and the first and second terminal parts. The metal container is electrically connected to the first switch terminal of the heat-responsive switch, thereby providing the first terminal part; and the second terminal part is electrically connected to the second switch terminal of the heat-responsive switch and is insulated from the metal container, with the second terminal part being connected to the second connective part of the first connective terminal.

Preferably, the first terminal part of the motor protector includes the second connective terminal and, the second connective terminal is electrically connected to the motor coil, and the second connective terminal has a fixed part that is fixed to the housing and a welding part that is welded to the first terminal part of the motor protector.

Preferably, the housing has an opening for accommodating an annular end on one terminal side of the motor protector and a support switch is capable of supporting the other end of the motor protector. Moreover, the installation position varying part is formed on the cylindrically shaped outer wall that also forms the space for accommodating the fuse element.

Further, the electromotive compressor has a sealed housing, and an electric motor and a compressor are disposed in the sealed housing. The air-tight terminals for external power supply are made to protrude in an assembly from the inner wall of the air-tight housing and the first connective part of the first connective terminal is removably attached to one of the said air-tight terminals which serve as common.

According to this invention which has been described above, where there has been provided an installation position varying part for installing the first connective terminal at an optional position in the housing of the protective device which is used in hermetic electromotive compressors, it becomes possible to install the protective device in conformity with various compressors with different design specifications and, even in the case of a single protective device, the range of its suitable applications can be greatly improved, thereby making it possible to lower the manufacturing cost and offer a protective device at lower cost.

BRIEF DESCRIPTION OF THE DRAWINGS

Other objects, advantages and details of the protective device of the invention appear in the following detailed description referring to the drawings in which.

DETAILED DESCRIPTION OF PREFERRED EMBODIMENT

Figure 1A:
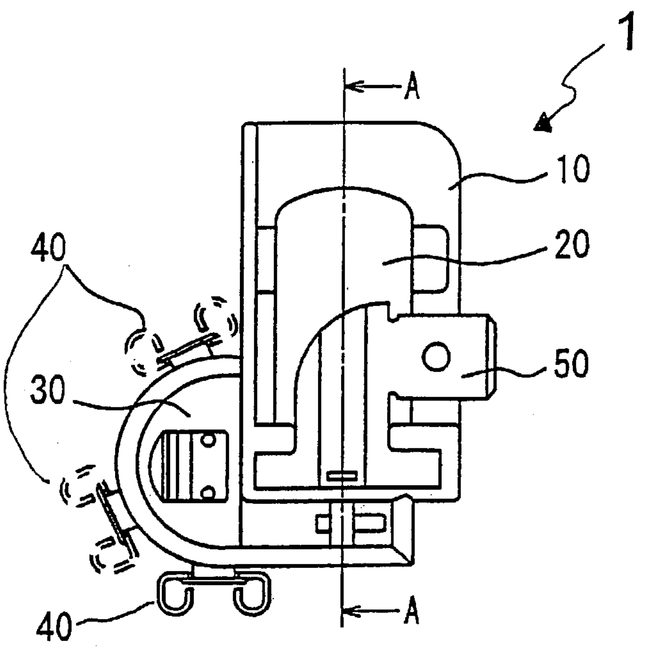
FIG. 1(*a*) is a top plan view of an internal protective device for a hermetic electromotive compressor made according to the preferred embodiment of the invention, FIG. 1(*b*) is front elevational view thereof, and FIG. 1(*c*) is a side elevational view thereof.
Figure 1B:
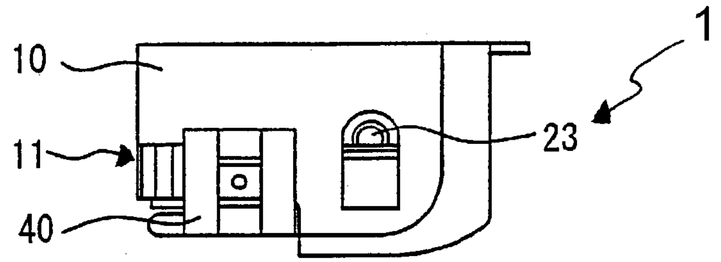
Figure 1C:
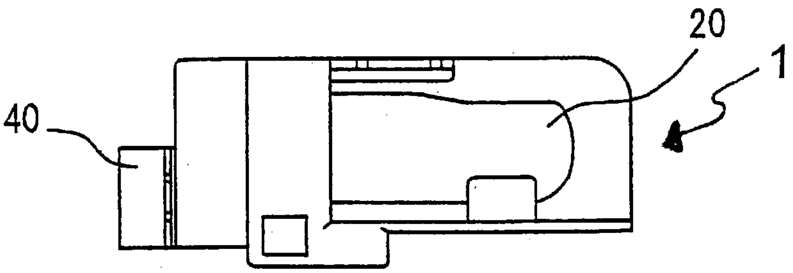

The internal protective device 1 of the cluster type made according to the preferred embodiment of the invention comprises a housing 10, a motor protector 20 held in the housing, a fuse element 30 installed on housing 10, a first connective terminal 40 connectable to a fusite pin and a quick connect terminal 50 or second connective terminal connectable to the terminal on the coil side. The first connective terminal 40 can be selectively installed at any given location from a plurality of installation positions of housing 10, with the position being selected in conformity with the installation environment (the lead-out wiring to the winding and the space and direction where the protective device is arranged) of the protective device 1 in the hermetic electromotive compressor. In FIG. 1(*a*), the connective terminals 40 are installed at three locations (one in solid and two in dashed lines) to facilitate the explanation.

As will be described below, protective device 1 is installed on a fusite pin in the hermetic electromotive compressor. Motor protector 20 functions to detect an abnormal current when the motor is running under an excess load or at an abnormal temperature due to a leakage of the cooling gas, etc., when such an abnormal situation is detected, it shuts off the circuit.

Figure 2:
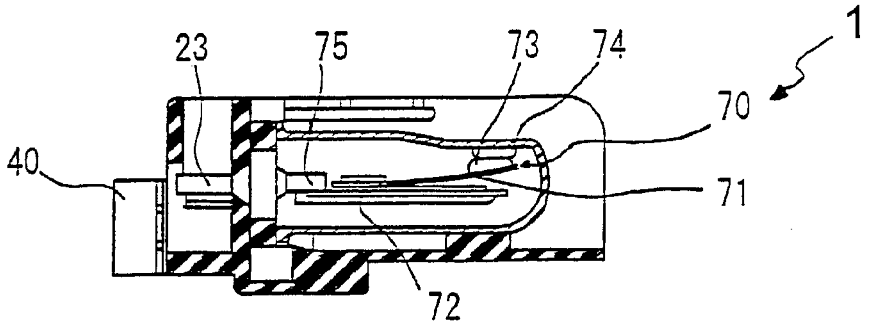
FIG. 2 is a cross sectional view taken along line A—A in FIG. 1(*a*)

As shown in FIG. 2, protector 20 contains a heat-responsive switch in the form of a bimetal switch 70 inside. Bimetal switch 70 includes a bimetal element 71 that has a terminal fixed to an electrode plate 72, in turn connected to an external terminal 23. Bimetal element 71 is fixed like a cantilever on electrode plate 72.

A movable contact 73 is provided at the other end of bimetal element 71 and movable contact 73 is electrically connectable under a certain contact pressure to a fixed contact 74 that has been installed on the inner wall of the metal container of motor protector 20. Movable contact 73 separates from the fixed contact 74 when the temperature of bimetal element 73 exceeds the trip temperature of bimetal element 71 due to heat generated in the bimetal element by excess current and/or an elevation of the ambient temperature.

Figure 9:
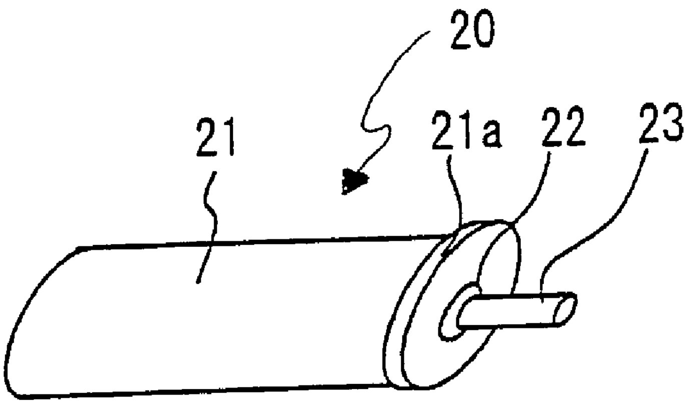
FIG. 9 is a perspective view of the outside appearance of the motor protector.

The outer appearance of motor protector 20 shown in FIG. 9 is such that it comprises a cylindrical container 21 made of a metal, a header 21*a* made of an electrically conductive metal for sealing an open end of the metal container 21, an insulating member 22 that electrically separates header 21*a* from an external terminal 23, and an external terminal 23 that protrudes form the center of the insulating member 22.

The metal container 21 is electrically connected to a fixed contact 74 which is a switching terminal on the inner wall as described above and the metal container 21 and the header 21*a* function as the first outer terminal of the protector 20.

In addition, electrode plate 72 is connected to an electrically conductive pin 75 inside the metal container 21 and this pin functions as the second external terminal 23.

Figure 3A:
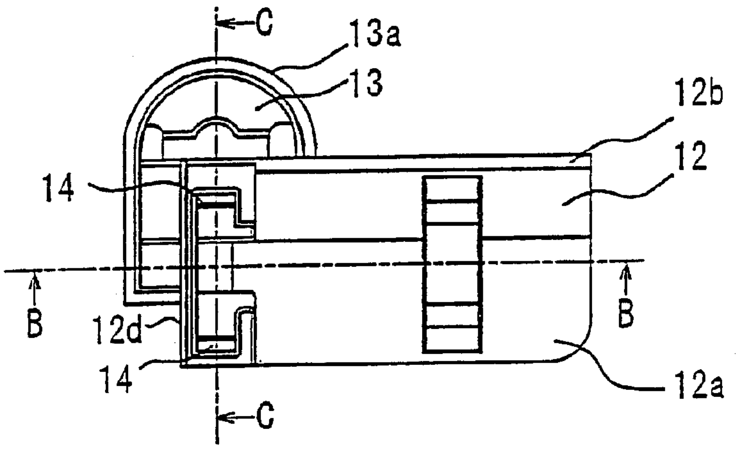
FIG. 3(*a*) is a top plan view of the housing of the FIG. 1 device, FIG. 3(*b*) is a cross sectional view taken along line B—B in FIG. 3(*a*), and FIG. 3(*c*) is a cross sectional view taken along line C—C in FIG. 3(*a*).
Figure 3B:
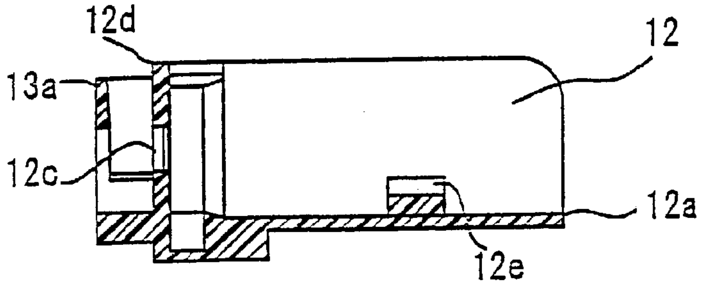
Figure 3C:
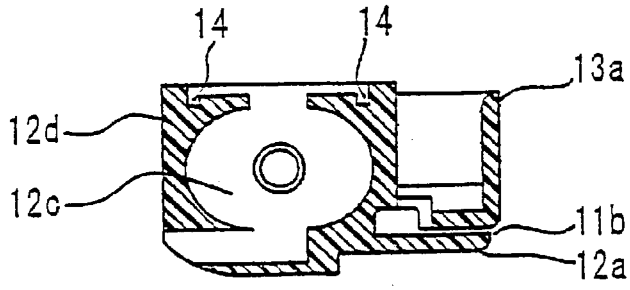

Housing 10 is made of an insulating plastic material. As shown in FIG. 3, it has a space 12 for accommodating and supporting motor protector 20 and a space 13 for accommodating and supporting a fuse element 30 which is adjacent to it. Space 12 is made of a base part 12*a* which is generally flat, a wall part 12*b* which extends, almost perpendicularly, from base part 12*a* and a wall part 12*d* where there is formed an opening 12*c* for the insertion of external terminal 23 and header 21*a*, annular in shape, at the tip of motor protector 20.

A support part 12*e* is integrally formed on base part 12*a* to support the end of motor protector 20. Support part 12*e* has an elliptical concave shape in conformity with the outside shape of the protector. When motor protector 20 has been installed at space 12, most of the upper surface of protector 20 is exposed. Because of this, the sensitivity of protector 20 to the ambient temperature is improved.

Space 13 is defined by a wall part 13*a* which is semi-cylindrical in shape, wall part 12*b* which is linked to wall part 13*a* and base part 12*a*. Space 13 is semi-cylindrical in shape with the top surface being open for accommodating a fuse element 30.

Figure 4A:
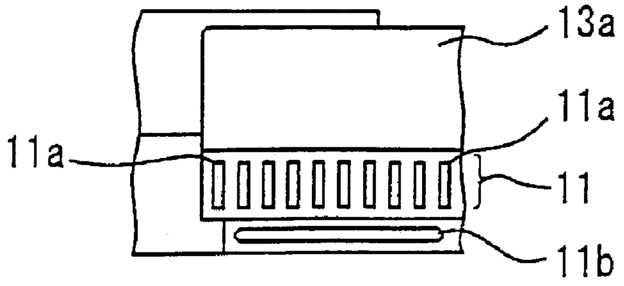
FIG. 4(*a*) is a broken away front elevational view of the installation position varying part of the housing and FIG. 4(*b*) is a top plan view of the FIG. 4(*a*) structure.
Figure 4B:
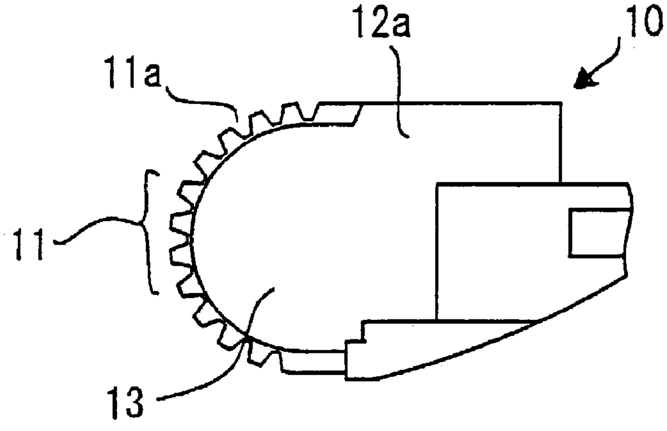

An installation position varying part 11, which makes it possible for the installation position of the first connective terminal 40 to be varied, is provided on semi-cylindrically shaped wall part 13*a* of housing 10. (Reference is to be made to FIG. 4.) The installation position varying part 11 includes a plurality of oblong slit-like grooves 11*a* that have been formed at equal intervals on the circumference of wall part 13*a*.

In the embodiment described, eleven grooves 11*a* are formed and they run in the direction of the longitudinal axis of the wall part 13*a* toward the bottom of the housing. A horizontal through slot 11*b* that extends in a horizontal direction is formed adjacent to and below grooves 11*a*, and the engaging part of the first connective terminal 40 is insertable through the slot in such a way as to slide freely.

Figure 5A:
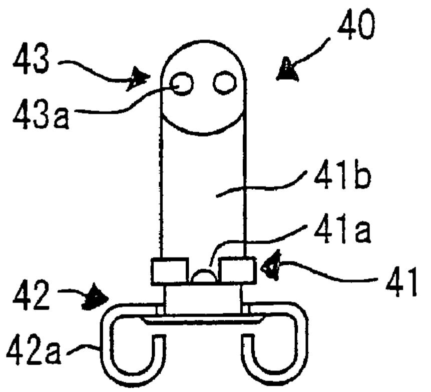
FIG. 5(*a*) is a top plan view of the first connective terminal of the FIG. 1 device, FIG. 5(*b*) is a front elevational view thereof and FIG. 5(*c*) is a side elevational view thereof, FIG. 6(*a*) is a front elevational view of a quick connect terminal of the FIG. 1 device and FIG. 6(*b*) is a side elevational view thereof.
Figure 5B:
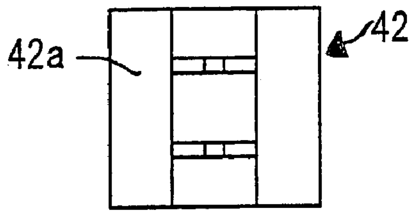
Figure 5C:
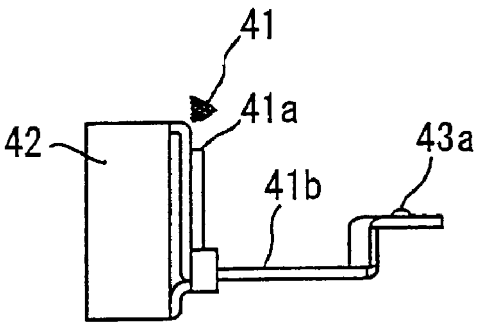

With reference to FIG. 5, first connective terminal 40 is formed by punching a sheet of suitable material such as a copper alloy and includes engaging part 41 which engages with the installation position varying part 11 of housing 10, a fusite pin connected part 42 which is connectable to a tab terminal that has been joined with the fusite pin or to the fusite pin itself and a fuse connecting part 43 that is connected to the fuse element 30. The fusite pin connecting part 42 has an insertion part 42*a* which makes it possible for the flat tab terminal to be freely movable.

The engaging part 41 is linked to the fusite pin connecting part 42 and it has a protuberant part 41*a* which can be inserted into a selected groove 11*a* of the installation position varying part 11 and an extension part 41*b* that extends in a direction which is at a right angle from the protuberant part 41*a*. The protuberant part 41*a* is elongated in a perpendicular direction and has an elongated protrusion of such a shape as is approximately equal to the slot 11*a*, with its tip being cylindrically shaped.

The extension part 41*b* extends in a horizontal direction from the bottom of the fusite connecting part 42, the direction being generally perpendicular to the longitudinal axes of grooves 11*a*. The extension part has a width which is smaller than the width of the insertion part 42*a* and the extension part 41*b* is inserted through the horizontal groove 11*b* of the installation position varying part 11. The fuse connecting part 43 is linked to the extension part 41*b* and contains a protrusion 43*a* for welding on its surface.

Figure 6A:
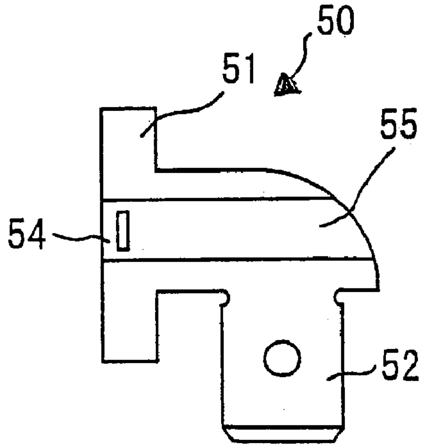
Figure 6B:
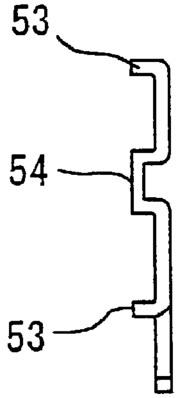

With reference to FIG. 6, quick connect terminal 50 is made by punching a sheet of suitable material, such as an iron-nickel alloy, for instance. It has a fixed part 51 that is fixed to housing 10 at its end and a terminal 52 that is connected to terminal (receptacle terminal) on the coil side of the motor at the other end. A pair of protrusions 53 are formed at both ends of fixed part 51. The pair of protrusions 53 are inserted into recesses 14 formed in wall 12*d* of the housing 10.

A flat welding part 54 has a protruding face formed at the center of the fixed part 51 and, when protector 20 has been arranged in space 12 of housing 10, welding part 54 is welded to the outer peripheral surface of header 21*a* of protector 20. At this time, external terminal 23 of protector 20 protrudes from opening 12*c* in wall 12*d*, the front of header 21*a* touches the surface of wall part 12*d* and the end of the container made of a metal is supported by the support part 12*e*.

Pull-out wiring is connected to terminal part 52 of quick connect terminal 50 to effect an electric connection with the motor coil. If the pull-out wiring is shifted by an internal force, etc., a load is added to the quick connect terminal 50; however, its possible deformation under an external force is prevented by forming the bent protrusion at the center of terminal 50. Further, by inserting protrusions 53 of the fixed part 51 into recesses 14 of the housing, a load that has been impressed on the quick connect terminal 50 is received by the housing 10, thereby avoiding the direct application of this load upon motor protector 20.

In this manner, the connection between the two is maintained in such a fashion that welding part 54 of the quick connect terminal 50 will not easily be peeled off motor protector 20.

Figure 7A:
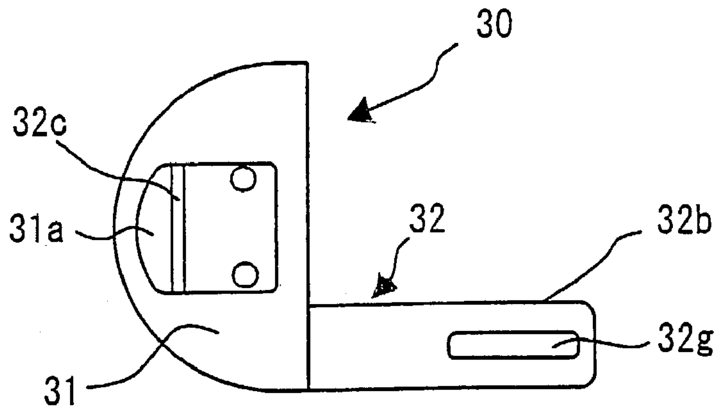
FIG. 7(*a*) is a top plan view of the fuse element of the FIG. 1 device, FIG. 7(*b*) is a front elevational view thereof, and FIG. 7(*c*) is a side elevational view thereof.
Figure 7B:
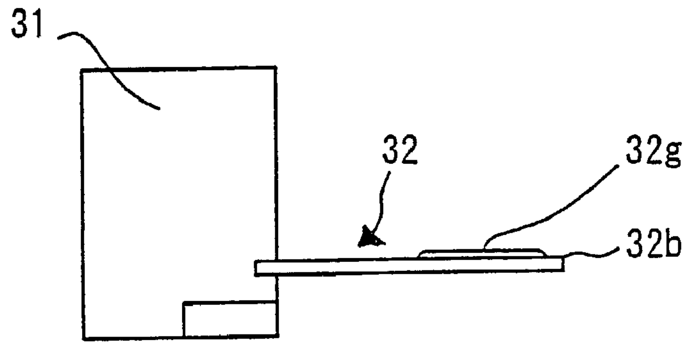
Figure 7C:
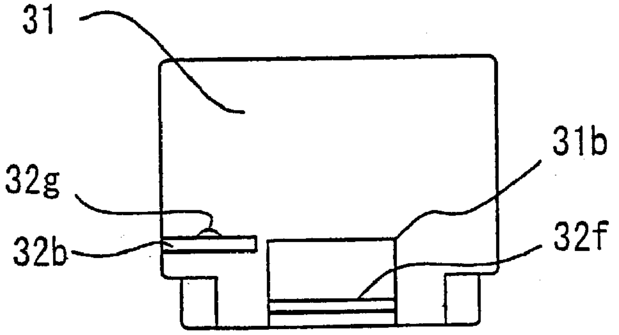

FIG. 7 shows a fuse element 30. Fuse element 30 has an insulating plastic part 31 and a metal part 32. The insulating plastic part 31 is made of a thermo-hardening plastic such as Bilo Glass, etc., to have a semi-cylindrical shape. A through hole 31*a* that runs from the top surface in a perpendicular direction is formed approximately at the center and the through hole 31*a* forms an opening 31*b* at the right side thereof. (Reference is to be made to FIG. 7(*c*).)

Figure 8A:
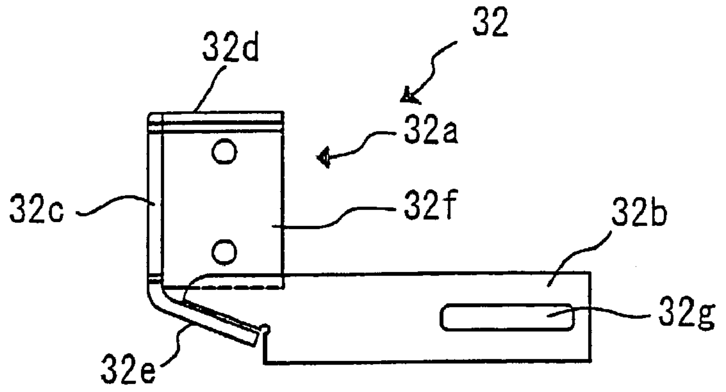
FIG. 8(*a*) is a top plan view of the metal piece of the fuse element of the FIG. 1 device, FIG. 8(*b*) is a front elevational view thereof, and FIG. 8(*c*) is a side elevational view thereof.
Figure 8B:
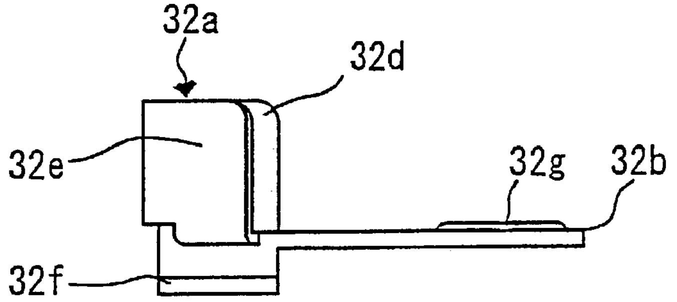
Figure 8C:
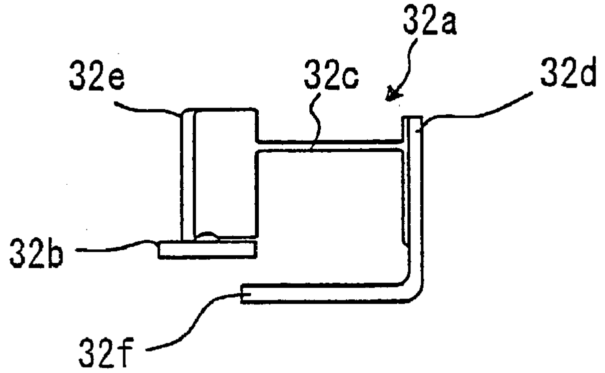

Metal part 32 has a fuse part 32*a* (shown in FIG. 8) that is disposed inside insulating plastic part 31 and a welding part 32*b* which is welded to the external terminal 23 (switch terminal) of protector 20. Fuse part 32*a* has a narrow-width metal part 32*c* that functions as a fuse and the metal parts 32*d* and 32*e* that extend in a perpendicular direction to be connected to both ends of the narrowwidth metal part 32*c*.

A welding part 32*b* is formed at the bottom of the metal part 32*e*. An oblong protuberant part 32*g* is formed on welding part 32*b*, with the external terminal 23 of protector 20 being welded onto the protuberant part 32*g*.

Fuse part 32*a* is placed in insulating plastic part 31 by means of insert molding. The narrow-width metal part 32*c* and the base part 32*f* of the fuse part 32*a* are exposed at openings 31*a* and 31*b*, respectively.

The connection and assembly of the various parts of the internal protective device now will be explained. Initially, fuse element 30 is inserted into space 13 of housing 10. Next, fuse connecting part 43 of first connective terminal 40 is inserted through the horizontal slot 11*b* and, at the same time, protrusion 41*a* of engaging part 41 is inserted into a groove 11*a* that has been selected from the plurality of grooves 11*a*, and connective terminal 40 is positioned at the installation position varying part 11 of housing 10. At this juncture, the installation position of connective terminal 40 is determined in due consideration of the direction of the installation of the internal protective device 1 inside the hermetic type electromotive compressor.

Fuse connective part 43 of connective terminal 40 is aligned with base 32*f* in all of the positions of terminal 40 determined by the inter-engagement of protrusion 41*a* and grooves 11*a* and is welded to base 32*f* of metal part 32 in opening 31*b* of fuse element 30. Next, motor protector 20 is installed in space 12 of housing 10. Header 21*a* of protector 20 is inserted into opening 12*c* on wall 12*d* and its end part is arranged on support 12*e*. In this position, external terminal 23 of protector 20 is on extended metal part 32 of fuse element 30, and external terminal 23 is welded to that extended part 32*g* of metal part 32.

Protruding parts 53 of fixed part 51 of the quick connect terminal 50 are inserted into recesses 14 formed at the top of housing 10 and, in this positioned state, welding part 54 is welded to the outer peripheral surface of header 21*a* of protector 20.

Figure 10:
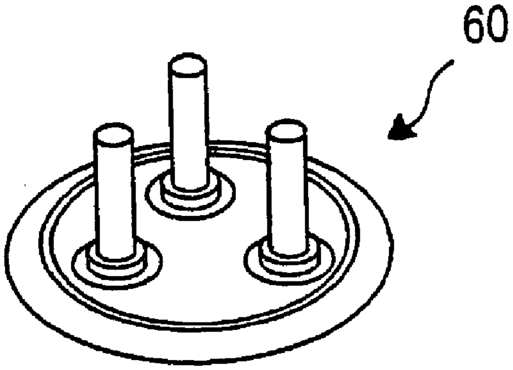
FIG. 10 is a perspective view of a fusite pin assembly.

In this manner, the internal protective device 1 which is shown in FIG. 1, is assembled and connective terminal 40 of the internal protective device 1 is installed at the common terminal C of the fusite pin assembly that has been provided on the inner wall of the housing of the hermetic electromotive compressor. Common terminal C of the fusite pin assembly shown in FIG. 10 has the shape of a pin; however, it is desirable for a tab terminal to be installed on the common terminal C pin, as shown, to facilitate removable engagement with fitting part 42*a* of first connective terminal 40.

Figure 11:
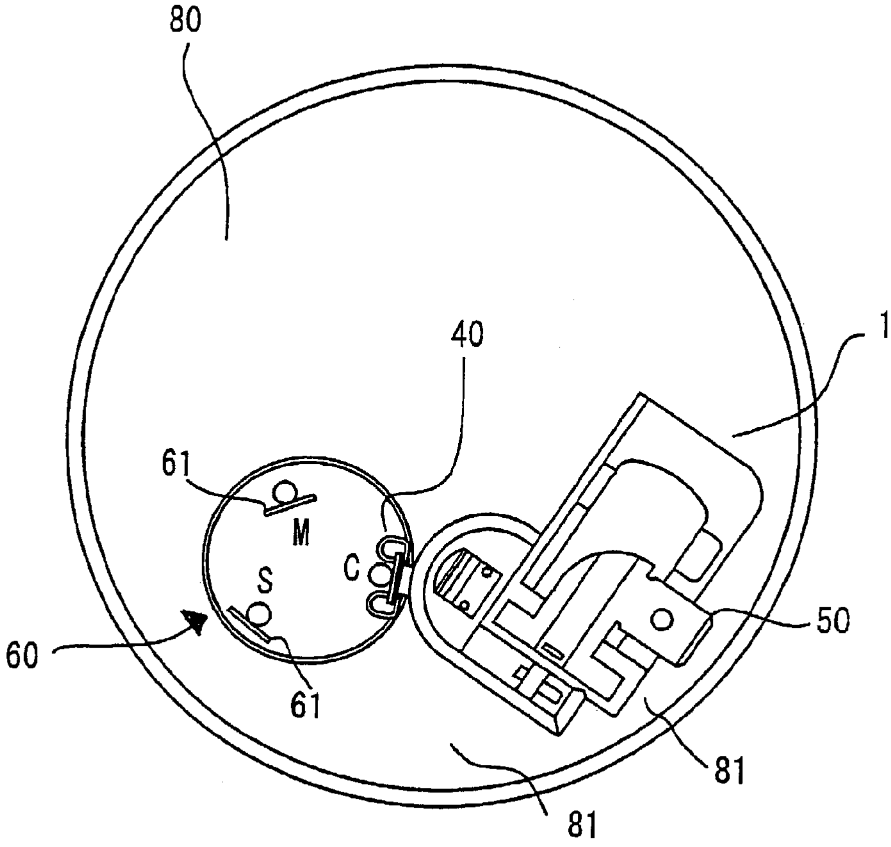
FIG. 11 is a plan view showing the protector device installed in a hermetic electromotive compressor.

FIG. 11 shows the state in which the internal protective device made according to the preferred embodiment of the invention has been installed inside the hermetic electromotive compressor. A fusite pin assembly 60 is provided on the inner wall 80 of the compressor housing and a tab terminal 61 is fixed to each pin of the fusite pin assembly 60. The inner protective device 1 is installed in due consideration of the position of the installation of the fusite pin assembly 60, the direction of the main winding terminal (M) of the fusite pin assembly, the auxiliary winding terminal (S) and the common terminal (C) and the space for the wiring led out of the main winding (M) and the auxiliary winding (S), etc.

In the example shown in FIG. 11, it becomes possible to align the main winding terminal (M), the auxiliary winding terminal (S) and the common terminal (the connective part 52 of the quick connect terminal) in such a fashion as to face downward by adjusting the direction of the internal protective device 1 and positioning the terminal part 52 of the quick connect terminal 50 in such a way as to face downward, thereby facilitating the wiring work for the wiring coming out of the motor winding. By leading the wiring into a limited space 81, moreover, it becomes possible to make the internal protective device and the wiring more compact.

When the hermetic electromotive compressor motor is run under an excessive load or when the atmosphere becomes extraordinarily hot, the bimetal element 71 of motor protector 20 shuts off the circuit, with a result that the power supply to the motor is terminated. When it becomes lower than the reset temperature of bimetal element 71, the power supply to the motor is automatically resumed.

If it becomes difficult to achieve automatic re-energization of the motor due to short-circuiting stemming from an accident such as welding of movable contact 73 of the bimetal element 71 to the fixed contact 74, etc., an excess current which is several times as large as the rated current flows and the small-width metal part 32*c* of the fuse element 30 is instantaneously cut off by the heat generated by the excess current, thereby causing the circuit to be shut off.

In this embodiment of the invention, a fuse element 30 has been provided separate from motor protector 20 in housing 10. However, it is possible to include the fuse element in protector 20 if desired. The fuse element has a fuse metal part whose cross sectional area is small, and external terminal 23 of protector 20 is connected to an end of the fuse metal part in container 21 made of metal and the other end of the fuse metal is connected to the bimetal element. In such case, fuse connective part 43 of first connective terminal 40 would be directly connected to external terminal 23 of motor protector 20. Through the use of such construction, the internal protective device can be reduced in size and this in turn can lead to a reduction in the size of the hermetic type electromotive compressor itself.

An example of the preferred embodiment of the invention has been explained above in detail. However, this invention is not to be restricted to this specific example. It can be modified or varied within the scope of this invention.

Regarding the internal protective device according to this embodiment, an example in which the fuse element is accommodated in the housing has been shown. However, it is not always essential to use the fuse element. In such case, the fuse connective part 43 of the connective terminal can be welded directly to external terminal 23 of motor protector 20. The shape, size and materials of the connective terminals or the quick connect terminal, etc., are not limited to those shown in the above explanation but can be suitable modified.

The number and the shape of the grooves 11*a* in the installation position varying part 11 are not limited to those mentioned in the above explanation and can comprise other numbers and shapes as desired. The shape of the space that has been provided in the housing, too, is not limited to what has been explained above. The upper surface of the housing may be covered or care can be exercised so that dust, etc., will enter its interior.

According to this invention which has been explained above, where an installation position varying part which is capable of varying the installation position of the connective terminal has been provided in the housing of the internal protective device, the position of the installation of the connective terminal can be changed in conformity with the environment in which the internal protective device is installed.

In other words, the internal protective device of this invention can be suitably used for hermetic electromotive compressors having different internal specifications. As a consequence, it becomes possible to offer an inexpensive internal protective device.

While the invention has been shown and described above with reference to preferred embodiments, the foregoing and other changes in form and detail my be made by one skilled in the art without departing from the spirit and scope of the invention.

What is claimed:

1. A protective device for installation inside an electromotive compressor, comprising a housing made of insulating material, a motor protector installed inside the housing, a heat-responsive switch disposed inside the motor protector and a first connective terminal that has a first connective part electrically connectable to an air-tight terminal that is provided on the electromotive compressor and a second connective part which is electrically connected to the said motor protector, the housing being provided with an installation position varying part which is capable of varying the installation position of the first connective terminal and the connective terminal being provided with an engaging part that engages with the installation position varying part.

2. A protective device as described in claim 1, wherein the installation position varying part contains a plurality of grooves that are formed on the housing and the engaging part contains a protuberant part which can be inserted into any selected groove of the plurality of grooves.

3. A protective as described in claim 2, wherein the grooves of the plurality of grooves are spaced approximately at equal intervals.

4. A protective device as described in claim 2, wherein the housing includes a cylindrical surface at a part thereof, with the plurality of grooves being formed on the cylindrical surface and at least one horizontal slot that extends in a horizontal direction formed adjacent to the plurality of grooves, and the second connective part of the first connective terminal passes through the at least one horizontal slot.

5. A protective device as described in claim 4 in which the cylindrical surface has a longitudinal axis and the grooves have longitudinal axes which are generally parallel to the longitudinal axis of the cylindrical surface, the horizontal slot extends in a direction generally perpendicular to the longitudinal axes and the protuberant part of the engaging part is elongated to generally conform to and fit within any selected groove.

6. A protective device as described in claim 5 in which the cylindrical surface defines a space within the housing and an electrically conductive base electrically connected to the motor protector is disposed in the space, the second connective part of the first connective terminal has a portion aligned with and engageable with the electrically conductive base when the protuberant part of the engaging part is inserted into any selected groove of the plurality of grooves.

7. A protective device as described in claim 6 further comprising a fuse element disposed in the space and wherein the electrically conductive base forms an electrical terminal of the fuse element.

8. A protective device as described in claim 1 further comprising a fuse element and the second connective part of the first connective terminal is electrically connected to the motor protector through the fuse element.

9. A protective device as described in claim 7, wherein the fuse element includes an insulative plastic part and a metal part which has been fixed inside the insulative plastic part and the insulative plastic part is disposed within the space defined by the cylindrical surface of the housing.

10. A protective device as described in claim 1, wherein the motor protector comprises a metal container and header and the protective device includes a second connective terminal that is electrically connectable to an electric motor winding and the second connective terminal has a fixed part which is secured to the housing and a welding part which is welded to the header of the motor protector.

* * * * *